FIP8102 OR 2,806,944

Y5014R

BS

Sept 17, 1957 B. SHEFFIELD ET AL 2,806,944

SWITCHING SYSTEM FOR STANDBY RECEIVER AND TRANSMITTER

Filed April 20, 1955 2 Sheets-Sheet 1

INVENTOR.
RAYMOND M. BALL, JR. AND
BERTHOLD SHEFFIELD
BY
Charles H. Brown
ATTORNEY

SWITCHING SYSTEM FOR STANDBY RECEIVER AND TRANSMITTER

Filed April 20, 1955 2 Sheets-Sheet 2

INVENTOR.
RAYMOND M. BALL, JR. AND
BERTHOLD SHEFFIELD
BY
Charles H. Brown
ATTORNEY 2,806,944

SWITCHING SYSTEM FOR STANDBY RECEIVER AND TRANSMITTER

Berthold Sheffield and Raymond M. Ball, Jr., Forest Hills, N. Y., assignors to Radio Corporation of America, a corporation of Delaware Application April 20, 1955, Serial No. 502,704

8 Claims. (Cl. 250—13)

Figure 1A:
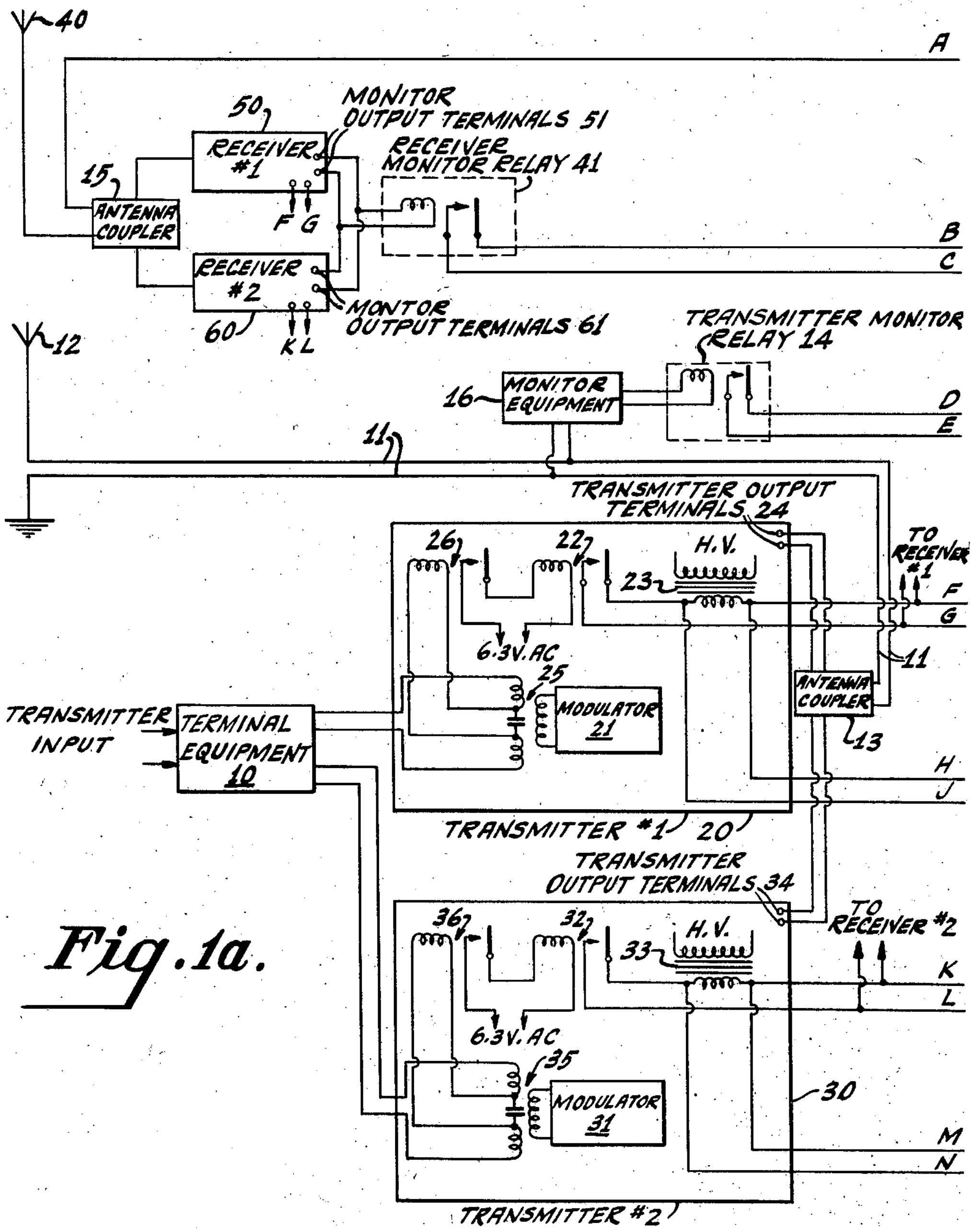

The invention relates to a switching system for automatically transferring a communication circuit from a transmitter and receiver upon failure of either piece of equipment to a standby transmitter and receiver.

For certain communication circuits, particularly communication circuits which must provide reliable and continuous operation, standby equipment is provided to be used upon failure of the normally operating equipment. Such reliable communication circuits requiring standby equipment may comprise portions of radio relaying systems, or railroad switching systems operable by radio, or point-to-point communication systems.

An object of the invention is to provide a switching system that automatically transfers a communication circuit from normally operating equipment upon failure thereof to standby equipment.

Another object of the invention is to transfer automatically a communication circuit from a transmitter and receiver upon failure of either the transmitter or receiver to a standby transmitter and receiver.

Another object of the invention is to test the regular transmitter of a communication circuit when an attempt is made to operate the transmitter and to test the regular receiver of a communication circuit periodically, and to switch the communication circuit to standby equipment upon failure of either the regular transmitter or receiver to satisfy certain conditions or performance requirements.

The invention provides a switching system for selectively applying a source of energizing potential to either regular or standby equipment by means of a transfer relay. This transfer relay energizes the regular transmitter and receiver if they function properly, and energizes the standby transmitter and receiver when either the regular transmitter or receiver fails. Whether the transfer relay energizes the regular equipment or the standby equipment depends upon whether the continuity of a control circuit is maintained. If the control circuit is unbroken, the transfer relay energizes the regular equipment, but if the control circuit is broken, the transfer relay energizes the standby equipment. The control circuit may have one of two paths. The first path includes the normally closed contacts of a transmitter status relay that are connected in parallel with the normally open contacts of a transmitter monitor relay. The transmitter status relay breaks the path through its contacts when the regular transmitter is used, and the transmitter monitor relay closes the path through its contacts when the regular transmitter produces a radio frequency output signal. The second path includes the first path and the normally open contacts of a receiver monitor relay that are serially inserted in the first path. The receiver monitor relay closes the path through its contacts when a suitable potential is produced by the regular receiver in response to a test signal selectively applied to its input circuit. A timer switch selects either the first or the second path for the control circuit. When the second path is selected, the test signal is applied to the input circuit of the regular receiver. If either selected path is broken because of a failure of either the regular transmitter or the regular receiver, the transfer relay energizes the standby equipment and de-energizes the regular equipment.

Figure 1B:
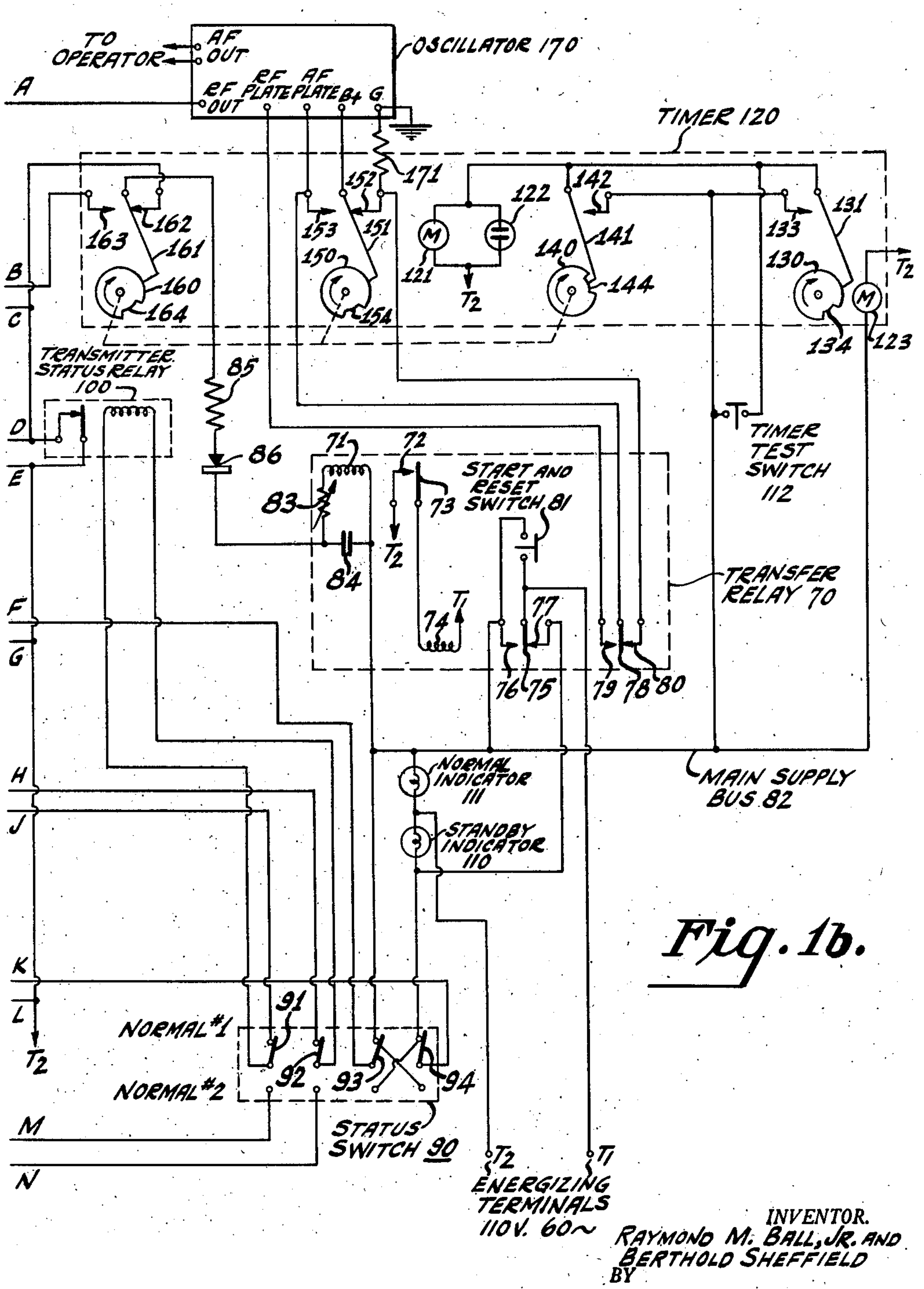

The invention is explained in detail in the following description, taken with reference to the accompanying drawing, in which:

Fig. 1 (*a*) shows transmitting and receiving apparatus to be used in a communication circuit and part of the switching system to be used with the apparatus; and Fig. 1 (*b*) shows the other part of the switching system to be used with the apparatus shown in Fig. 1 (*a*).

The connections between Figs. 1 (*a*) and (*b*) are indicated by the lettered leads at the right and left edges respectively of the figures. Leads bearing the same letters are to be considered as being connected together.

*Description*

Referring first to Fig. 1 (*a*), terminal equipment 10 is provided to couple an input circuit, such as a microphone, to the input transformers 25, 35 of the modulators 21, 31 of first and second transmitters 20, 30, indicated by the block diagrams. Only those parts of the transmitters 20, 30 are shown that are necessary to understand the invention. These transmitters 20, 30 may be of any suitable type, it being assumed that the circuit is intended for tone or voice point-to-point communication. If telegraphy is used, the invention may still be used, as will be apparent to those skilled in the art. In series with each of the input transformers 25, 35 of the modulators 21, 31 are D.-C. relays 26, 36 which are operated by a D.-C. voltage applied from the terminal equipment 10 each time the regular transmitter is used by an operator. When so operated, the D.-C. relays 26, 36 cause the A.-C. relays 22, 32 to close the energizing circuits carried by the leads G and L respectively to one terminal of the primary windings of the high voltage plate transformers 23, 33. The other terminals of the primary windings of the high voltage transformers 23, 33 are energized by the leads F and K. The high voltage transformers 23, 33 must be energized to make the respective transmitters 20, 30 operable. One pair of leads H and J are connected to the primary terminals of the first transmitter high voltage transformer 23, and another pair of leads M and N are connected to the primary terminals of the second transmitter high voltage transformer 33. These leads are associated with the switching system, and their function is explained in the explanation of the system. The radio frequency outputs from the transmitters 20, 30 are derived from output terminals 24, 34 respectively, and applied to an antenna coupler 13. The antenna coupler 13 is coupled to a transmitting antenna 12 by a transmission line 11. Separate antenna couplers, transmission lines, and transmitting antennas may be used if desired.

Suitable monitor equipment 16 is bridged across the transmission line 11 to produce a suitable energizing potential for the winding of a transmitter monitor relay 14 from the radio frequency energy that appears on the transmission line 11. Leads D and E are connected to the contacts of the transmitter monitor relay 14. These contacts are normally open so that the path between the leads D and E is also normally open or broken. When either the first or second transmitter 20, 30 produces a radio frequency output signal, the winding of the transmitter monitor relay 14 is energized and causes the contacts to close a path between the leads D and E.

Also associated with the transmitting and receiving apparatus are first and second suitable communication receivers 50, 60, indicated by block diagrams. These receivers 50, 60 may be of the superheterodyne type for receiving signals transmitted from a remotely located transmitter. They are connected to a single receiving antenna 40 through a suitable antenna coupler 15, although separate receiving antennas may be used. The receiver outputs for energizing a receiver monotor relay 41 are derived from monitor output terminals 51, 61 respectively. This energy may be taken from a suitable point which is not necessarily the final output circuit of the receivers 50, 60. The first receiver 50 is energized by the same leads F and G used to energize the high voltage transformer 23 of the first transmitter 20. Likewise, the second receiver 60 is energized by the same leads K and L used to energize the high voltage transformer 33 of the second transmitter 30.

The winding of a receiver monitor relay 41 is bridged across the monitor output terminals 51, 61 of both the receivers 50, 60. Leads B and C are connected to the contacts of the receiver monitor relay 41. These contacts are normally open so that the path between the leads B and C is also normally open or broken. For test purposes, a radio frequency signal is applied over the lead A (from an oscillator 170) to the antenna coupler 15 or suitable input circuits of both the receivers 50, 60. If either receiver is operable, this test signal produces a suitable potential at the monitor output terminals 51, 61 to energize the winding of the receiver monitor relay 41 and close the contacts and the path between the leads B and C.

The other part of the switching system to be used with the apparatus shown in Fig. 1 (*a*) is shown in Fig 1 (*b*). A suitable source of energizing potential, such as 110 v. 60 cycles alternating current, may be applied to the system through the energizing terminals T1, T2. One terminal T1 is connected to an energizing armature 75 of the transfer relay 70, and to a start and reset switch 81. A regular contact 76 associated with the energizing armature 75 is connected to a main supply bus 82 and also to the push-button type spring-actuated start and reset switch 81. This switch 81 is closed only as long as pressure is applied to it. A standby contact 77 associated with the energizing armature 75 is connected to the status switch 90. The energizing armature 75 is actuated by a first winding 74 that has one end connected to the one energizing terminal T1, and the other end connected to a primary armature 73. Associated with this primary armature 73 is a contact 72 that is connected to the second energizing terminal T2. This primary armature 73 is operated by a second winding 71 that has one end connected to the main supply bus 82 and to one terminal of a capacitor 84. This second winding 71 is energized by direct current rectified from the energizing alternating current by a rectifier 86. A variable resistor 83 is connected between the other terminal of the capacitor 84 and the other end of the second winding 71. The first winding 74 also actuates a timer armature 78 that is connected to the timer 120. A standby contact 80 associated with the timer armature 78 is also connected to the timer 120, and a regular contact 79 associated with the timer armature 78 is connected to an oscillator 170.

The status switch 90 comprises a double throw switch having four poles 91, 92, 93, 94. The switch 90 has a first normal and a second normal position. The first and second poles 91, 92 are connected to the winding of a transmitter status relay 100. The contacts of the transmitter status relay 100 are normally closed, and are connected to the leads D and E. The contacts associated with the first and second poles 91, 92 in the first normal position are connected to the leads H and J, which are connected to the primary winding of the high voltage transformer 23 of the first transmitter 20. The contacts associated with the first and second poles 91, 92 in the second normal position are connected to the leads M and N, which are connected to the primary winding of the high voltage transformer 33 of the second transmitter 30. The third pole 93 is connected to the lead F, which is connected to one end of the primary winding of the high voltage transformer 23 of the first transmitter 20. Likewise, the fourth pole 94 is connected to the lead K, which is connected to one end of the primary winding of the high voltage transformer 33 of the second transmitter 30. The contact associated with the third pole 93 in the first normal position is connected to the main supply bus 82 and also to the contact associated with the fourth pole 94 in the second normal position. The contact associated with the fourth pole 94 in the first normal position is connected to a standby indicator 110, to the standby contact 77 associated with the energizing armature 75, and to the contact associated with the third pole 93 in the second normal position.

The standby indicator 110, which may be an incandescent light or some other device, is connected to the second energizing terminal T2. A normal indicator 111, which may also be an incandescent light or some other device, is connected between the main supply bus 82 and the second energizing terminal T2.

The timer 120, enclosed in the dashed lines, comprises four rotatable cams 130, 140, 150, 160. The first cam 130 is separately driven in the direction indicated by a first motor 123 that is connected between the main supply bus 82 and the second energizing terminal T2. A first spring follower 131 rests against the first cam 130, and when the first follower 131 drops into the depression 134 in the cam 130, the first follower 131 engages a test contact 133. This test contact 133 is connected to the main supply bus 82. In a preferred embodiment, the first cam 130 is revolved four revolutions per hour, and is designed so that the first follower 131 engages the test contact 133 for one-fifteenth of each revolution of the first cam 130, or for approximately one minute. Other speeds of revolution and periods of engagement are also possible. A push-button type spring-actuated test switch 112, for energizing a second timer motor 121 at any time, is connected between the main supply bus 82 and the first follower 131. This switch 112 is closed only as long as pressure is applied to it.

The second motor 121 and the neon indicator light 122 are connected in parallel, and connected between the first follower 131 of the first cam 130 and the second energizing terminal T2. In a preferred embodiment, this second motor 121 drives the other three cams 140, 150, 160 in the direction indicated at sixty revolutions per hour. The three cams 140, 150, 160 are preferably mounted on the same shaft, and the angular relation between the respective depressions 144, 154, 164 must remain fixed. Each of the depressions 144, 154, 164 is designed so that the second and third spring followers 141, 151 are in their respective depressions 144, 154 for one-fifteenth of each revolution of the respective cams 140, 150, or for approximately four seconds, and so that the fourth spring follower 161 is in its depression 164 for one-twentieth of each revolution of the cam 160, or for approximately three seconds. The speed at which the cams 140, 150, 160 rotate and the length of time the followers 141, 151, 161 are in their respective depressions 144, 154, 164 can be changed to give any duration and repetition rate of sampling period that may be desired.

The second follower 141 is connected to the first follower 131, and the test contact 142 engaged by the second follower 141 is connected to the main supply bus 82. The third follower 151 is connected to the terminal B+ to which is connected a source of D.-C. potential that is positive with respect to ground. The normal contact 152 engaged by the third follower 151 is connected through a resistor 171 to ground, and to the standby contact 80 associated with the timer armature 78. The test contact 153 that is engaged by the third follower 151 for periods of four seconds is connected to the plate circuit of the audio frequency portion of the oscillator 170 and also to the timer armature 78. The fourth follower 161 is serially connected through a resistor 85 and the rectifier 86 to the junction of the variable resistor 83 and the capacitor 84. The normal contact 162 engaged by the fourth follower 161 is connected to the lead C, which is connected to the receiver monitor relay 41. This normal contact 162 is also connected to the lead D which is connected to the contacts of the transmitter monitor relay 14 and the transmitter status relay 100. The test contact 163 is engaged by the fourth follower 161 for periods of three seconds, beginning approximately one second after the third follower 151 engages its test contact 153, and is connected to the lead B, which is connected to the armature of receiver monitor relay 41. The plate circuit of the radio frequency portion of the oscillator 170 is connected to the normal contact 79 associated with the timer armature 78.

An audio frequency signal is generated by the oscillator 170 at the terminals "AF Out" whenever the source of D.-C. potential at the terminal B+ is applied to the plate circuit of the audio frequency portion of the oscillator 170. This signal is utilized by the operator, as will be subsequently explained. A radio frequency signal is generated by the oscillator 170 at the terminal "RF Out" whenever the source of D.-C. potential at the terminal B+ is applied to the plate circuit of the radio frequency portion of the oscillator 170. This radio frequency signal is applied to the antenna coupler 15 and the input circuits of both receivers 50, 60 over the lead A.

*Operation*

The switching system shown in Figs. 1 (*a*) and (*b*) provides means for automatically transferring a communication circuit from a regular transmitter and receiver to a standby transmitter and receiver upon failure of either the regular transmitter or the regular receiver. When the first transmitter 20 and the first receiver 50 serve as the regular transmitter and receiver, the second transmitter 30 and the second receiver 60 serve as the standby transmitter and receiver. When the second transmitter 30 and the second receiver 60 serve as the regular transmitter and receiver, the first transmitter 20 and the first receiver 50 serve as the standby transmitter and receiver. Either condition may be selected by means of the status switch 90 shown in Fig. 1 (*b*). As shown in Fig. 1 (*b*), the status switch 90 is in the position to connect the first transmitter 20 and the first receiver 50 as the regular transmitter and receiver.

The switching system is shown in the standby condition, with the second transmitter 30 and second receiver 60 being energized over a path from one terminal T1 through the energizing armature 75, the standby contact 77, the contact associated with the fourth pole 94 of the status switch 90 in the first normal position, the fourth pole 94, the lead K, and the lead L, back to the second energizing terminal T2. Assuming that all the apparatus is working properly, the switching system is started or reset by momentarily depressing the start and reset switch 81. This connects the energizing terminal T1 to the main supply bus 82. With the main supply bus 82 energized, the first motor 123 begins to rotate the first cam 130, the normal indicator 111 is energized, and the transfer relay 70 becomes energized. The transfer relay 70 is energized by direct current over a control circuit from the main supply bus 82 through the second winding 71, the variable resistor 83, the rectifier 86, the resistor 85, the fourth follower 161 and its normal contact 162, and the contacts of either the transmitter status relay 100 or the transmitter monitor relay 14, back to the second energizing terminal T2. When the second winding 71 is energized, the primary armature 73 engages its associated contact 72 to energize the first winding 74. When the first winding 74 is energized, the energizing armature 75 engages its regular contact 76, and the timer armature 78 engages its regular contact 79. With the energizing armature 75 engaging its regular contact 76, the main supply bus 82 is energized by the energizing armature 75 and will remain energized as long as the energizing armature 75 engages its regular contact 76. This energizing armature 75 and regular contact 76 will remain engaged as long as the first winding 74 is energized, and the first winding 74 will remain energized as long as the second winding 71 is energized. The second winding 71 will remain energized as long as continuity of the control circuit from the main supply bus 82 to the second energizing terminal T2 remains unbroken or closed.

With the main supply bus 82 so energized, the first transmitter 20 and receiver 50 are energized over a path from the main supply bus 82 through the contact associated with the third pole 93 of the status switch 90 in the first normal position, the third pole 93, the lead F, and the lead G, back to the second energizing terminal T2.

With the timer armature 78 engaging its regular contact 79, the plate circuits of the audio frequency and radio frequency portions of the oscillator 170 are connected together. When in this condition, the switching system is ready for operation.

The transfer from regular apparatus (namely, the first transmitter 20 and receiver 50) to standby apparatus (namely, the second transmitter 30 and receiver 60) will occur if the contacts of the transmitter monitor relay 14 and the contacts of the transmitter status relay 100 are both broken at the same time to de-energize the second and first windings 71, 74 of the transfer relay 70. When the regular transmitter 20 is turned on or used in this particular embodiment, the D.-C. relay 26 is energized, which in turn energizes the A.-C. relay 22. With the A.-C. relay 22 energized, its contacts close to energize the primary winding of the high voltage transformer 23 and also the winding of the transmitter status relay 100. The winding of the transmitter status relay 100 is connected in parallel with the primary winding of the high voltage transformer 23 by the first and second poles 91, 92 of the status switch 90, and the leads H and J. Normally, when the winding of the transmitter status relay 100 is energized, its contacts will be broken. However, at the same time, the contacts of the transmitter monitor relay 14 will close if a radio frequency output signal is produced by the first transmitter 20 and appears on the transmission line 11. Thus, the continuity of the control circuit from the main supply bus 82 to the second energizing terminal T2 is maintained. Since the second winding 71 of the transfer relay 70 is energized by direct current, the short interval between the time that the contacts of the transmitter status relay 100 are broken and the time that the contacts of the transmitter monitor relay 14 close will be compensated for by the charge on the capacitor 84. This charge on the capacitor 84 will hold the second winding 71 energized for a sufficient length of time to prevent an erroneous transfer to the standby transmitter 30 and receiver 60 at the beginning and end of the operation or use of the first transmitter 20.

The condition of the regular receiver (in the example assumed, the first receiver 50) is checked by periodically inserting the contacts of the receiver monitor relay 41 in series with the control circuit and applying a radio frequency test signal to the input circuit of the regular receiver. If a suitable output signal is produced by the regular receiver in response to the test signal, the contacts of the receiver monitor relay 41 will be closed, thereby maintaining continuity of the control circuit from the main supply bus 82 to the second energizing terminal T2. The test signal is produced by the oscillator 170, and the duration and repetition rate of the test signal is determined by the timer 120. As previously explained, the first cam 130 is rotated by the first motor 123 which operates as long as the main supply bus 82 is energized. During the one minute interval when the first follower 131 engages its test contact 133, the second motor 121 which drives the other cams 140, 150, 160 is energized. Once the second cam 140 begins to revolve, the second follower 141 engages its test contact 142 to keep the second motor 121 energized for one minute every fifteen minutes. During this one minute interval, a sampling period of four seconds will take place.

The sampling period for the regular receiver 50 begins approximately one second after the third follower engages its test contacts 153. The third follower 151 applies the D.-C. potential appearing at the B+ terminal to the plate circuits of the audio frequency and radio frequency portions of the oscillator 170. An audible tone is produced at the audio frequency output terminals (designated "AF Out"), and this tone may be used to indicate to an operator that the receiver sampling period is taking place. Likewise, a radio frequency signal appears at the radio frequency output terminal (designated "RF Out"), and this signal is applied to the input circuit of the regular receiver over the lead A for four seconds. One second after the oscillator 170 begins producing the audio frequency and radio frequency signals, the fourth follower 161 breaks its engagement with the normal contact 162 and engages the test contact 163 for a period of three seconds. Thus, the control circuit from the main supply bus 82 includes the contacts of the receiver monitor relay 41 in addition to the contacts of either the transmitter monitor relay 14, or the transmitter status relay 100. If the regular receiver produces a suitable output signal in response to the radio frequency signal applied to its input circuit, the winding of the receiver monitor relay 41 is energized and closes the contacts for the period of four seconds in which the radio frequency signal is applied. Since these operations must occur at predetermined times to prevent an erroneous transfer to the standby apparatus, the angular relation between the depressions 134, 144, 154, 164 on the cams 130, 140, 150, 160, and particularly between the third and fourth depressions 154, 164, must remain fixed. Any delay between the time that the fourth follower 161 disengages its normal contact 162 and engages its test contact 163 is compensated for by the charge on the capacitor 84. Since, in a preferred embodiment, the fourth follower 161 does not engage its test contact 163 until approximately one second after the radio frequency test signal is applied to the input circuit of the regular receiver, the contacts of the receiver monitor relay 41 will be closed approximately one second before the fourth follower 161 engages its test contact 163 if the normal receiver reproduces the test signal. The test signal is removed at substantially the same time that the fourth follower 161 engages its normal contact 162 again.

If the contacts of the receiver monitor relay 41 fail to close during the sampling period, the continuity of the control circuit is broken. This breaks the energizing path for the second winding 71, which results in the energizing path for the first winding 74 being broken also. This allows the energizing armature 75 to engage its standby contact 77, and the timer armature 78 to engage its standby contact 80. In this condition, the standby indicator 110 is energized and the standby transmitter 30 and receiver 60 are energized over a path from one energizing terminal T1 through the energizing armature 75, the standby contact 77, the contact associated with the fourth pole 94 of the status switch 90 in the first normal position, the fourth pole 94, the lead K, and the lead L, back to the second energizing terminal T2. The main supply bus 82 is de-energized, thus de-energizing the normal transmitter and receiver, the normal indicator 111, and the timer 120. Also in this condition, the source of D.-C. potential at the terminal B+ is applied to the plate section of the audio frequency portion of the oscillator 170 over a path through the third follower 151, its normal contact 152, the standby contact 80, and the timer armature 78, to produce a continuous audible tone. This tone indicates to the operator that the standby transmitter and receiver are being used.

To test the timer 120, the timer test switch 112 may be closed long enough to energize the second motor 121 and initiate one sampling period which has been described. A neon indicator light 122 is energized during the period that the second motor 121 is energized, and serves to indicate that the sampling period has been initiated.

When the standby transmitter and receiver are energized, the regular transmitter and receiver are de-energized to permit servicing. When both transmitters and receivers are in operable condition, the status switch 90 may be positioned to make either set of transmitter and receiver the regular apparatus. This is desirable in order to operate all equipment for suitably shared periods of time.

The invention claimed is:

1. A switching system for automatically transferring a communication circuit from regular transmitting and receiving apparatus to standby transmitting and receiving apparatus upon failure of either said regular transmitting or receiving apparatus, comprising a control circuit having two selectable paths, the first of said paths comprising a transmitter relay for closing said first path in response to an output signal from said regular transmitting apparatus, the second of said paths comprising said first path and a receiver relay serially connected in said first path for closing said second path in response to a test signal from said regular receiving apparatus, a timer connected to said control circuit for selecting one of said paths, and a transfer relay connected to said control circuit for energizing said regular apparatus in response to said control circuit being closed, or for energizing said standby apparatus in response to said control circuit being broken.

2. A switching system for automatically transferring a communication circuit from regular transmitting and receiving apparatus to standby transmitting and receiving apparatus upon failure of either the regular transmitting or receiving apparatus, comprising a control circuit having two selectable paths, the first of said selectable paths comprising two parallel paths, one of said parallel paths comprising a transmitter status relay for breaking said one parallel path in response to said regular transmitting apparatus being used and the other of said parallel paths comprising a transmitter monitor relay for closing said other parallel path in response to an output signal produced by said regular transmitting apparatus, the second of said selectable paths comprising said first selectable path and a receiver relay serially connected in said first selectable path for closing said second selectable path in response to a signal produced by said regular receiving apparatus, a timer connected to said control circuit for selecting one of said selectable paths, and a transfer relay connected to said control circuit for energizing said regular apparatus in response to said control circuit being closed, or for energizing said standby apparatus in response to said control circuit being broken.

3. A switching system for automatically transferring a communication circuit from regular transmitting and receiving apparatus to standby transmitting and receiving apparatus upon failure of either the regular transmitting or receiving apparatus, comprising a control circuit having two paths, the first of said paths comprising a transmitter relay for closing said first path in response to an output signal produced by said regular transmitting apparatus, the second of said paths comprising said first path and a receiver monitor relay serially connected in said first path for closing said second path in response to an output signal produced by said regular receiver from a test signal applied to an input circuit of said regular receiving apparatus, a timer connected to said control circuit for selecting one of said paths and for applying a test signal to said input circuit, and a transfer relay connected to said control circuit for energizing said regular apparatus in response to said control circuit being closed, or for energizing said standby apparatus in response to said control circuit being broken.

4. A switching system for automatically transferring a communication circuit from a regular transmitter and receiver to a standby transmitter and receiver upon failure of either the regular transmitter or the regular receiver comprising a control circuit having two selectable paths, the first of said selectable paths comprising two parallel paths, one of said parallel paths comprising a transmitter status relay for breaking said one parallel path in response to said regular transmitter being used and the other of said parallel paths comprising a transmitter monitor relay for closing said other parallel path in response to an output signal produced by said regular transmitter, the second of said selectable paths comprising said first selectable path and a receiver monitor relay serially connected in said first selectable path for closing said second selectable path in response to an output signal produced by said regular receiver from a test signal applied to an input circuit of said receivers, a timer connected to said control circuit for selecting said first selectable path or for selecting said second selectable path and applying a test signal to said input circuit of said regular receiver, and a transfer relay connected to said control circuit for energizing said regular transmitter and receiver in response to said control circuit being closed, or for energizing said standby transmitter and receiver in response to said control circuit being broken.

5. A switching system for automatically transferring a communication circuit from a regular transmitter and receiver to a standby transmitter and receiver upon failure of either the regular transmitter or regular receiver, comprising a pair of terminals for applying an energizing potential to said system, a control circuit connected between said terminals, said control circuit having two selectable paths, the first of said selectable paths comprising two parallel paths, one of said parallel paths comprising the normally closed contacts of a transmitter status relay, said transmitter status relay breaking the normally closed path through its contacts in response to said regular transmitter being used, and the other of said parallel paths comprising the normally broken contacts of a transmitter monitor relay, said transmitter monitor relay closing the normally broken path through its contacts in response to an output signal produced by said regular transmitter, the second of said selectable paths comprising said first selectable path and the normally broken contacts of a receiver monitor relay serially connected in said first selectable path, said receiver monitor relay closing the normally broken path through its contacts in response to an output signal produced by said regular receiver from a test signal applied to an input circuit of both of said receivers, a timer connected to said control circuit for selecting said first selectable path or for selecting said second selectable path and simultaneously applying a test signal to said input circuit of said regular receiver when said second selectable path is selected, a transfer relay having its winding serially connected in said control circuit, said transfer relay having first contacts for energizing a main supply bus when said control circuit is closed and having second contacts for energizing said standby transmitter and receiver when said control circuit is broken, means for connecting said regular transmitter and receiver to said main supply bus, and means for connecting said standby transmitter and receiver to said second contacts of said transfer relay.

6. A switching system as defined in claim 5, wherein said means for connecting said regular transmitter and receiver to said main supply bus and said means for connecting said standby transmitter and receiver to said second contacts of said transfer relay comprise a two position status switch that alternately connects said main supply bus to said regular transmitter and receiver, said second contacts of said transfer relay to said standby transmitter and receiver, and the winding of said transmitter status relay to said regular transmitter in one of said positions, or connects said main supply bus to said standby transmitter and receiver, said second contacts of said transfer relay to said regular transmitter and receiver, and said transmitter status relay winding to said standby transmitter in the other of said positions for changing the operating status of said transmitters and receivers.

7. A switching system as defined in claim 5, wherein said timer comprises rotatable cams and followers for selecting said second selectable path and applying said test signal to said input circuit at a predetermined time, for a predetermined period, and at a predetermined repetition rate, energizing an indication signal during the occurrence of said period, and energizing a signal generator for indicating when said standby transmitter and receiver are energized.

8. A switching system for automatically transferring a communication circuit from regular transmitting and receiving apparatus to standby transmitting and receiving apparatus upon failure of either said regular transmitting or receiving apparatus, comprising a path having a relay for closing said path in response to an output signal from the regular transmitting apparatus, said path also including in series therewith a periodically operative timer, said timer having a pair of selectable alternative output circuits for completing said path, and said timer being periodically operative to select first one and then the other of said circuits, a relay controlled by the receiving apparatus for opening or closing one of said alternative circuits, means for supplying a test signal to said receiving apparatus during the interval said timer selects said one circuit, and a transfer relay in said path for enabling said regular transmitting and receiving apparatus in response to a flow of energy in said completed path, and for disabling said regular transmitting and receiving apparatus and for enabling said standby apparatus in response to an interruption in said path.

References Cited in the file of this patent

UNITED STATES PATENTS

| | | |
|---|---|---|
| 1,573,801 | Bown | Feb. 23, 1926 |
| 2,355,363 | Christaldi | Aug. 8, 1944 |
| 2,699,495 | Magnuski | Jan. 11, 1955 |